United States Patent
Maletzko et al.

(10) Patent No.: US 6,727,291 B2
(45) Date of Patent: Apr. 27, 2004

(54) PREPARATION OF EXPANDABLE PROPYLENE POLYMER BEADS

(75) Inventors: Christian Maletzko, Altrip (DE); Klaus Hahn, Kirchheim (DE); Isidor de Grave, Wachenheim (DE); Gerd Ehrmann, Deidesheim (DE); Franz-Josef Dietzen, Ludwigshafen (DE)

(73) Assignee: BASF Aktiengesellschaft, Ludwigshafen (DE)

(*) Notice: Subject to any disclaimer, the term of this patent is extended or adjusted under 35 U.S.C. 154(b) by 437 days.

(21) Appl. No.: 09/985,476

(22) Filed: Nov. 5, 2001

(65) Prior Publication Data

US 2002/0074680 A1 Jun. 20, 2002

Related U.S. Application Data

(63) Continuation of application No. 09/750,760, filed on Jan. 2, 2001.

(30) Foreign Application Priority Data

Jan. 25, 2000 (DE) .......................... 100 03 021

(51) Int. Cl.[7] .............. C08J 9/22; C08J 9/228

(52) U.S. Cl. .............. 521/60; 521/79; 521/81; 521/142

(58) Field of Search ............ 521/60, 79, 142

(56) References Cited

U.S. PATENT DOCUMENTS

| 5,389,320 | A | * | 2/1995 | Martynowicz |
| 5,468,781 | A | | 11/1995 | Sugano et al. |
| 5,773,481 | A | | 6/1998 | Fischer et al. |

FOREIGN PATENT DOCUMENTS

| DE | A 199 50 420 | 9/2000 |
| EP | 0 540 271 A1 | 5/1993 |
| EP | A 588 321 | 3/1994 |
| EP | A 788 310 | 6/1997 |

* cited by examiner

*Primary Examiner*—Morton Foelak
(74) *Attorney, Agent, or Firm*—Oblon, Spivak, McClelland, Maier & Neustadt, P.C.

(57) ABSTRACT

A process prepares expandable propylene polymer beads by mixing propylene polymer melt with a volatile organic blowing agent and with a nucleating agent in an extruder, whereupon the extrusion and pelletization of the extruded takes place in a water bath under conditions of temperature and pressure at which practically no foaming of the pellets takes place.

12 Claims, No Drawings

PREPARATION OF EXPANDABLE PROPYLENE POLYMER BEADS the application is a continuation of application Ser. No. 09/750,760 filed on Jan. 2, 2001.

The invention relates to a process for preparing expandable propylene polymer beads with a bulk density of more than 450 g/l by mixing propylene polymer melt with a volatile blowing agent in an extruder, extruding the melt and pelletizing the extruded.

Increasing quantities of polyolefin foam beads are used to produce foam moldings in automotive construction, for packaging and in the leisure sector. However, compared with unfoamed expandable beads, e.g. those based on polystyrene, foam beads are very voluminous, and this is a disadvantage during transport and storage because large amounts of space are required.

German Patent Application P 199 50 420.2 describes a process for preparing expandable polyolefin beads, in which polyolefin pellets in aqueous suspension in a pressure vessel are impregnated with an organic blowing agent, and the mixture is cooled below 100° C. prior to release of pressure. However, this produces large amounts of waste water which generally has contamination by suspension stabilizers.

A number of publications, e.g. EP-A 588 321 and DE-A 197 56 264, disclose the preparation of polypropylene foam beads by mixing polypropylene with a volatile blowing agent in an extruder, extruding with foaming, and pelletizing the foam extruded.

EP-A 778 310 describes a process for preparing polyolefin foam beads, in which a first step prepares partially foamed beads with a bulk density of from 120 to 400 g/l by extruding polyolefin comprising solid blowing agents, and these beads are then further foamed in a second stage with steam.

However, the preparation of unfoamed expandable propylene polymer beads with a bulk density of more than 450 g/l by extruder impregnation has never been described.

It is an object of the present invention, therefore, to develop a low-cost process for preparing expandable propylene polymer beads. We have found that this object is achieved if during the extruder impregnation of propylene polymer with a volatile blowing agent the extrusion and pelletization is undertaken under conditions of temperature and pressure at which practically no foaming of the pellets takes place.

The expandable propylene polymer beads prepared according to the invention are practically unfoamed beads with a bulk density of more than 450 g/l, preferably more than 500 g/l. After storage for one hour at room temperature in free contact with the atmosphere they can be foamed to a bulk density of less than 300 g/l, preferably less than 250 g/l, by heating to 130–160° C., in particular 150° C.

The first condition expresses the fact that the propylene polymer melt practically does not foam when extruded from the extruder, and, depending on the composition and bead shape, the raw propylene polymer pellets have a bulk density of 500 to 700 g/l. The second condition expresses the fact that, even after storage for one hour in free contact with the atmosphere, the propylene polymer beads still comprise a sufficient amount of blowing agent and can therefore still be foamed successfully. Storage for one hour at room temperature in free contact with the atmosphere is therefore important in practice, and is also realistic, since in industry the treatment and handling of the beads comprising blowing agent prior to their packaging and after removal from the packaging prior to foaming does not take more than one hour in total. It is intended that very little blowing agent should escape during this period. Since the beads have generally been packed within closed containers or in gas-tight film sacks when they are being stored or transported, the amount of blowing agent which can escape during these processes is also insignificant. The beads comprising blowing agent and prepared according to the invention can normally be stored for a number of days without the escape of any relatively large amounts of blowing agent. Longer periods of storage in the open should, however, be avoided.

For the purposes of the present invention, propylene polymers are
a) homopolypropylene,
b) random copolymers of propylene with from 0.1 to 15% by weight, preferably from 0.5 to 12% by weight, of ethylene and/or of a $C_4$–$C_{10}$ α-olefin, preferably a copolymer of propylene with from 0.5 to 6% by weight of ethylene or with from 0.5 to 15% by weight of 1-butene, or a terpolymer made from propylene, from 0.5 to 6% by weight of ethylene and from 0.5 to 6% by weight of 1-butene, or
c) a mixture of a) or b) with from 0.1 to 75% by weight, preferably from 3to 50% by weight, of a polyolefin elastomer, e.g. of an ethylene-propylene block copolymer with from 30 to 70% by weight of propylene.

Preference is given to homo- or copolymers of propylene with up to 15% by weight of ethylene and/or 1-butene, and particularly to propylene-ethylene copolymers with from 1 to 5% by weight of ethylene. They have a melting point of from 130 to 160° C. and a density (at room temperature) of about 900 g/l.

The propylene polymer may have been blended with up to 50% of its weight of other types of thermoplastic with a glass transition temperature (DSC inflexion) below 180° C. Examples of suitable thermoplastics are polyamides in amounts of from 5 to 40% by weight, and customary compatibilizers, e.g. block copolymers., such as Exxelor P 1015 (EXXON) may be added to this mixture.

In the novel process, 100 parts by weight of propylene polymer pellets together with from 3 to 30 parts by weight of a volatile organic blowing agent and from 0.01 to 8 parts by weight, preferably from 0.1 to 5 parts by weight, of a fine-particle nucleating agent, and also, if desired, with other customary additives, are introduced into an extruder and mixed there at a temperature at which the mixture comprising blowing agent is present as a melt, preferably at from 160 to 220° C.

Examples of suitable nucleating agents are talc, waxes, in particular polyolefin waxes, paraffins, graphite powder, fumed silicas, citric esters, and also modified or unmodified bentonite. Other additives which may be used are antioxidants, stabilizers, flame retardants, fillers and pigments. At a downstream point within the extruder, from 3 to 30 parts by weight, preferably from 5 to 25 parts by weight, of the volatile organic blowing agent are fed with the aid of a pump. It is also possible for the nucleating agent and, if desired, other additives to be added here, together with the blowing agent, rather than beforehand, in which case it is appropriate for the additives to have been dissolved or suspended in the blowing agent. A substantive factor for the invention is the correct choice of the blowing agent. Its boiling point should be from −5 to 150° C., in particular from 25 to 125° C. The blowing agent is preferably an alkane, an alkanol, a ketone, an ether or an ester. Particular preference is given to pentanes, hexanes and heptanes, in particular sec-pentane, and also to 3,3-dimethyl-2-butanone and 4-methyl-2-pentanone. Mixtures of blowing agents may also be used. The blowing agent is preferaby halogen-free. However, there may be a small amount of halogen-containing blowing agents in the mixture.

According to the invention, to prevent foaming of the melt during discharge from the extruder, the extrusion and pelletization of the extrudate is undertaken under conditions of temperature and pressure at which practically no foaming of the pellets takes place. These conditions may vary depending on the type of the propylene polymer, of the additives, and in particular on the type and amount of the blowing agent used. Ideal conditions may readily be determined by exploratory experiments.

A useful industrial method is underwater pelletization in a water bath which has a temperature below 100° C. and is under a pressure of above 2 bar. The temperature must not be too low, otherwise the melt sets on the die plate, and it must not be too high, otherwise the melt expands. Increasing the boiling point of the blowing agent or reducing the amount of the blowing agent permits higher water temperatures and lower pressures to be used. In the case of the particularly preferred blowing agent sec-pentane, the ideal temperature of the water bath is from 30 to 60° C. and the water pressure is from 8 to 12 bar.

In principle it is also possible to use what is known as water-cooled die-face pelletization, in which the chopping space is enclosed so that the pelletizer can operate at superatmospheric pressure.

The beads comprising blowing agent may be foamed by customary methods with hot air or steam in pressure prefoamers. In the case of foaming with steam, depending on the type of blowing agent and polymer matrix, and on the desired bulk density, steam pressures of from 2 to 4.5 bar, the foaming times vary from 3 to 30 sec. and the temperature during foaming should be from 130 to 160° C. In the case of a single foaming procedure the bulk densities achieved are below 300 g/l. It may be appropriate for technical or economic reasons to foam two or more times in order to establish a low bulk density.

The resultant foam beads may be used to produce foam moldings by known methods.

EXAMPLES

Starting Materials:

PP: Novolen 3200 MC; polypropylene from Targor GmbH

Wax 1: Luwax AF31; polyethylene (Mn 3000) from BASF AG

Wax 2: Luwax EVA3; polyvinyl acetate copolymer from BASF AG

Talc: Grade HP 325

EMX 948: organically modified bentonite from Süd Chemie

Graphite: Graphitwerk Kropfmühl AG, grade AF

MIBK: Methyl isobutyl ketone sec-pentane: Technical pentane isomer mixture

Preparation and Foaming of the Pellets

The amounts given (parts by weight) of the starting materials are mixed and fed to the extruder. The blowing agent was pumped under pressure into the extruder at a downstream point along the screw. The die plate was subject in each case to the water pressure specified in the table, which also gives the water temperature. The chopped pellets were carried with the water flow to a cyclone where they were separated off from the water and collected.

Prior to foaming the pellets were stored in the open at room temperature for 1 hour. The table shows the blowing agent content and the bulk density of the propylene polymer beads directly after extrusion and, respectively, after storage and foaming.

The beads can be foamed in customary pressure prefoamers to give foam beads.

|  | Example 1 | Example 2 | Example 3 | Example 4 |
|---|---|---|---|---|
| PP | 100 | 100 | 100 | 100 |
| Wax 1 | 0.5 | 1 | 1 |  |
| Wax 2 |  |  |  | 1 |
| Talc | 1 | 1 |  |  |
| Graphite |  |  |  | 1 |
| MIBK | 25 |  |  |  |
| sec-pentane |  | 10 | 15 | 10 |
| EMX 948 |  |  | 2 |  |
| Water pressure [bar] | 9 | 6 | 9.5 | 8.5 |
| Water temperature [° C.] | 50 | 55 | 50 | 50 |
| Blowing agent content [pts. by wt.] | 21.9 | 6.5 | 9.5 | 5.8 |
| Bulk density [g/l] after extrusion | 555 | 500 | 455 | 515 |
| Bulk density [g/l] after foaming | 280 | 245 | 237 | 250 |

We claim:

1. A process for preparing expandable propylene polymer beads, comprising:
   mixing from 3–30 parts by weight of a volatile organic blowing agent and from 0.01 to 8 parts by weight of a fine-particle nucleating agent into 100 parts by weight of propylene polymer melt in an extruder; and
   extruding the melt and pelletizing the extrudate under conditions of temperature and pressure at which practically no foaming of the pellets occurs, thereby producing said expandable propylene polymer beads having a bulk density of more than 450 g/l.

2. The process as claimed in claim 1, which comprises extruding the material in said extruder into a water bath which has a temperature below 100° C. and is under a pressure above 2 bar, and pelletizing the extrudate in the water bath.

3. The process as claimed in claim 1, wherein the propylene polymer is a copolymer of propylene with up to 15% by weight of ethylene and/or 1-butene.

4. The process as claimed in claim 1, wherein the blowing agent is an alkane, an alkanol, a ketone, an ether, an ester or a mixture thereof.

5. The process as claimed in claim 4 wherein the blowing agent is a pentane, a hexane, a heptane, 3,3-dimethyl-2-butanone or 4-methyl-2-pentanone.

6. The process as claimed in claim 1, wherein the nucleating agent is a wax, talc, graphite or an unmodified or modified bentonite.

7. The process as claimed in claim 2, wherein the blowing agent is sec-pentane, and the temperature and pressure in the water bath range from 30 to 60° C. and from 8 to 12 bar, respectively.

8. The process as claimed in claim 1, wherein the bulk density of the propylene polymer beads is more than 500 g/l.

9. The process as claimed in claim 8, wherein the propylene polymer pellets have a bulk density ranging from 500 to 700 g/l.

10. The process as claimed in claim 1, wherein the amount of said fine-particle nucleating agent ranges from 0.1 to 5 parts by weight.

11. The process as claimed in claim 1, wherein the propylene polymer of said propylene polymer melt is (a) homopolypropylene, (b) a random copolymer of propylene with from 0.1 to 15% by weight of ethylene and/or a $C_4$–$C_{10}$-α-olefin or a terpolymer of propylene with from 0.5 to 6% by weight of ethylene and from 0.5 to 6% by weight of 1-butene, or (c) a mixture of (a) or (b) with from 0.1 to 75% by weight of a polyolefin elastomer.

12. The process as claimed in claim 1, wherein, in the mixing of the volatile organic blowing agent and fine-particle nucleating agent in the propylene polymer melt, one or more additives useful in the preparation of expandable propylene polymer beads are incorporated in the material being mixed in the extruder.

* * * * *